United States Patent [19]

Geren

[11] Patent Number: 4,703,873

[45] Date of Patent: Nov. 3, 1987

[54] REUSABLE LID FOR BEVERAGE CANS

[76] Inventor: Keith L. M. Geren, 9944 Walnut St., No. 2099, Dallas, Tex. 75243

[21] Appl. No.: 877,472

[22] Filed: Jun. 23, 1986

[51] Int. Cl.[4] .................. B65D 47/06; B65D 17/52
[52] U.S. Cl. ........................ 222/192; 220/85 SP; 220/90.2; 220/90.6; 222/542
[58] Field of Search ................ 220/254, 90.2, 90.4, 220/90.6, 287, 375, 85 SP; 222/192, 542, 570, 569, 89, 88

[56] References Cited

U.S. PATENT DOCUMENTS

| | | | |
|---|---|---|---|
| 3,372,832 | 3/1968 | Yeater et al. | 220/90.2 |
| 3,807,457 | 4/1974 | Logsdon | 220/287 |
| 3,994,411 | 11/1976 | Elfelt et al. | 220/90.4 |
| 4,215,793 | 6/1980 | Packard | 220/270 |
| 4,244,488 | 1/1981 | Fridl et al. | 220/260 |
| 4,518,094 | 5/1985 | Kodman | 220/254 |
| 4,579,257 | 4/1986 | Brandlein | 220/90.2 |

Primary Examiner—George T. Hall
Attorney, Agent, or Firm—Hubbard, Thurman, Turner & Tucker

[57] ABSTRACT

A detachable lid of plastic construction for the sealed closure of an opened beverage can. Forming the lid is a central body portion surrounded by a downwardly depending double step flange perimeter to accommodate beverage cans of two different diameters. A pour opening located through the body is partially defined on its underside by a downwardly depending spout adapted to penetrate inward of a can opening thereat while being defined topside by an upwardly extending free standing rim of a predetermined geometric configuration. A closure cap adapted to cooperate with the pour opening is formed in the free end of an elongated flexible strap secured to the body.

8 Claims, 4 Drawing Figures

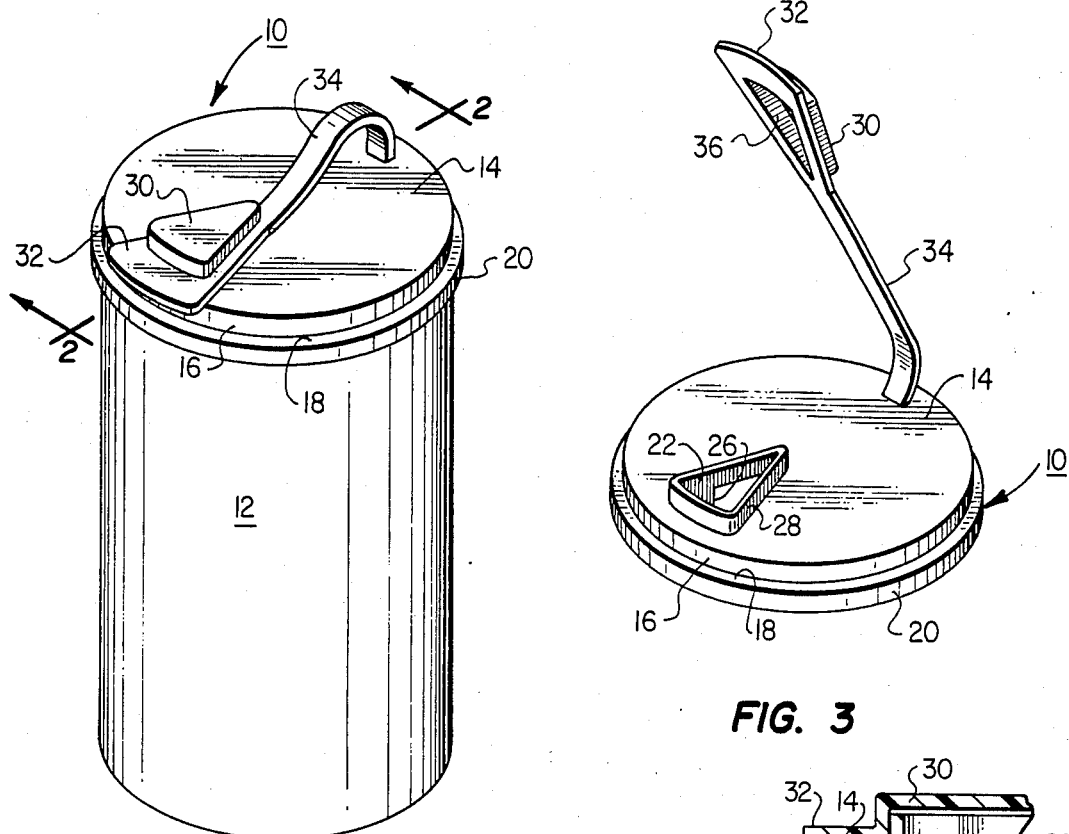
FIG. 1
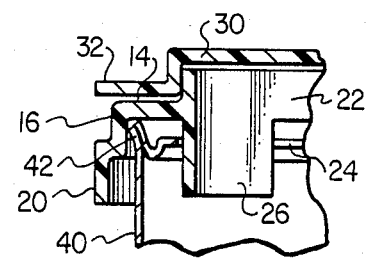
FIG. 3
FIG. 4
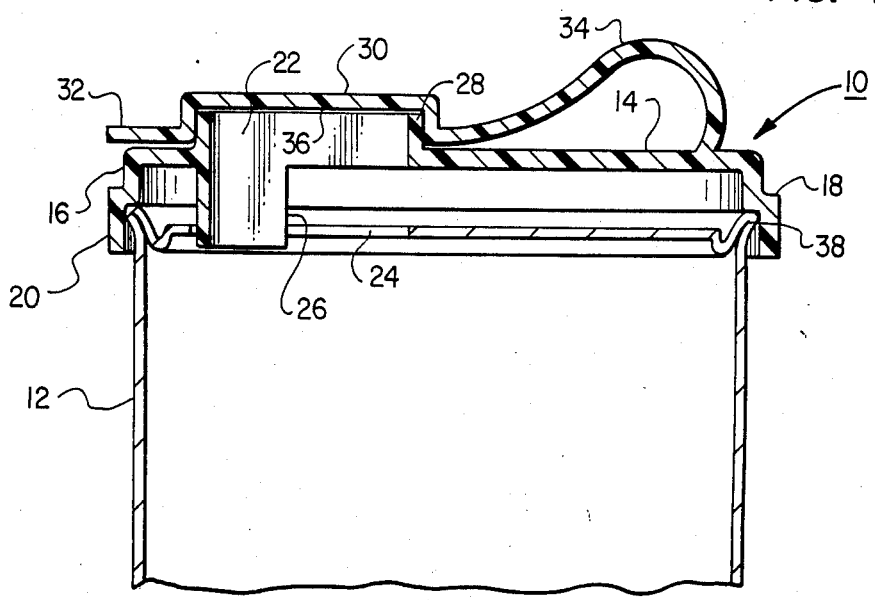
FIG. 2

REUSABLE LID FOR BEVERAGE CANS

Applicant claims the benefit of disclosure docment No. 131207 filed Sept. 28, 1984.

TECHNICAL FIELD

The field of art to which the invention pertains comprises the art of closure lids for unresealable beverage cans.

BACKGROUND OF THE INVENTION

The trend among domestic beverage manufacturers in recent years has been to dispense pre-packaged potable beverages by can in preference to bottles. At least in the 8 oz. to 12 oz. serving size, cans have come to largely dominate the pre-package beverage market as compared to bottles.

While cans for beverages such as soft drinks and beer have many market virtues, they have the disadvantge of not being resealable once opened. That is, the opening of the can for consumption of the beverage content usually entails removing a tab of sorts that until removed represents a permanent portion of the can body defining the leakproof canned enclosure. Because of the inability to reseal the can of an otherwise unconsumed or incompletely consumed content, it has become common to utilize snap-on caps or lids of sorts in order to close off the can opening until the beverage consumption is to be initiated or resumed. By means of such lids, most inadvertent spillage is avoided while at the same time foreign matter is prevented from entering the can when the can is left opened and exposed. To enable intermittent consumption, at least some of such lids in the prior art provide for a resealable pour opening in the body of the lid which can be opened or capped as required. Exemplifying lids and/or similarly intended devices of the prior art are the disclosures of U.S. Pat. No. 3,994,411; 4,215,793; 4,244,488; and 4,518,094.

While such prior art constructions would appear to function satisfactorily for their intended purposes, they generally are uncomfortable to drink from directly other than by straw and are generally unable to contain spillage occurring in the space intervening between the lid and the can top. In many instances, the lid covered can is hand held during which can tippage can or does occur particularly when being held during the course of travel such as by car or boat in which the occupants are subjected to varying degrees of travel motion. Moreover, such lids are constructed so as to fit only a single can size requiring a correspondence of different lid sizes and a matched fitting for each can size. In common use today are cans of about 2 7/16 and 2 9/16 inches in diameter typically utilized for both beer and soft drinks.

SUMMARY OF THE INVENTION

This invention relates to detachable lids for beverage cans. More specifically, the invention relates to such lids that are more effectively able to minimize if not eliminate the adverse effects of spillage between the can and lid while at the same time enjoying the versatility of being usable on cans of more than one diameter.

In a first important aspect of the invention the lid construction is comprised of a disc-like body having a periphery defined by a double stepped annular turned down flange. The innermost flange is sized as to afford a snap-on fit with a first diameter of beverage can while the outer and relatively larger flange comprises the perimeter sized for a snap-on fit onto a can of relatively larger diameter. Affording a double flange fit in that manner is obviously advantageous in the flexibility and versatility which it achieves in a single cap as compared to the two separate caps previously required. By means thereof, the inconvenience of having separate caps and the associated problem of having to match cap and can size for size is thereby eliminated.

In another important aspect of the invention, the pour opening in the lid not only is adapted to overly the can opening when the lid is appropriately positioned, but also includes a pour spout extending vertically inward of the can opening from the underside of the lid while terminating upward above the plane of the lid in a free standing flange or rim. By virtue thereof, pouring of the beverage content through the lid opening without a straw directly into the mouth is more comfortable to the consumer of the content while spillage and splatter is considerably reduced from what could otherwise occur in the manner of the prior art constructions.

In a still further aspect of the invention the lid includes a closure cover for the lid opening comprised of a snap or spillproof plug integrally attached to the lid body via an elongated flexible strap. Being shaped with an internal recess complementary to the shape of the pour rim, the snap-on fit of the plug on the rim can readily and conveniently be applied for closing the pour opening with a minimum of required attention. Yet by virtue of an all plastic construction, the manufacturing costs for such lids in volume is minimal.

It is therefore an object of the invention to provide a novel lid construction for beverage cans.

The above noted features and advantges of the invention as well as other superior aspects thereof will be further appreciated by those skilled in the art upon reading the detailed description which follows in conjunction with the drawing.

BRIEF DESCRIPTION OF THE DRAWINGS

FIG. 1 is an isometric illustration of the lid of the invention positioned in place on a beverage can;

FIG. 2 is a partial sectional elevation as seen substantially along the line 2—2 of FIG. 1;

FIG. 3 is an isometric view of the lid per se in its open pouring relation; and

FIG. 4 is a fragmentary sectional view corresponding to FIG. 2 as adapted for use on a beverage can of a relatively smaller diameter.

DESCRIPTION OF THE PREFERRED EMBODIMENT

In the description which follows, like parts are marked throughout the specification and drawing with the same reference numerals, respectively. The drawing figures are not necessarily to scale and in certain views parts may be drawn rotated into the plane of the drawing for purposes of clarity.

Referring now to the drawing, the lid hereof is designated 10 and is shown in position in FIGS. 1 and 2 on a beverage can 12 of the relatively larger diameter size as will be understood.

Lid 10 which could be of metal such as aluminum is preferably comprised of a molded polymer plastic composition having a disc-like body 14. Body 14 merges about its periphery with a downwardly depending annular flange 16 which in turn merges with a stepped shoulder 18 that merges with outer perimeter downwardly depending annular flange 20. Formed in body 14 is a triangular shaped pour opening 22, adapted when the lid is properly positioned on a previously opened can 12, to be located generally coincident with the can opening 24.

Partially defining opening 22 from the underside of body 14 is a downwardly depending spout 26 adapted to extend inwardly of the can opening 24. Topside the opening 22 is defined raised above the surface of body 14 by a selectively configured upright and free standing rim or flange 28.

To open or seal opening 22 there is provided a snap-on cap 30 located formed in the end of a tab 32 representing the distal end of a flexible and elongated strap 34 integrally attached to body 14. As seen in FIGS. 2 and 3, cap 30 is formed raised above the surface level of strap 34 from an internal underside recess 36 complementary configured and closely dimensioned with the shape and size of rim 28.

As illustrated in FIG. 2, the can 12 includes an outer rim 38 of diameter adapted to be received in the internal perimeter of lid flange 20 for engagement with the underside of shoulder 18. For the can 40 of relatively smaller diameter as illustrated in FIG. 4, the rim 42 thereof is adapted to be received within the inner perimeter flange 16 at the merged intersection with the underside of body 14. By virtue of the increased penetration enabled by the smaller diameter can 40 within the lid 10 as compared with that of can 12, spout 26 for the application of FIG. 4 extends a comparably increased distance inward of the can through the opening 24.

To utilize rather than remove the lid 10 for consumption of the can content from either the larger can 12 or the smaller can 40, it is necessary first that the can opening 24 be provided in the can by removal of the appropriate tab provided for that purpose by the can manufacturer. With the lid generally aligned, with triangular pour opening 22 in approximate registry with can opening 24, places spout 26 in position able to penetrate into the can opening 24. In that relation, the lid can be snapped into place over the cylindrical top of the can so as to tightly fit onto the larger can 12 as shown in FIG. 2 or onto the smaller can 40 as shown in FIG. 4. To then consume the beverage content of either can through the lid opening 22, cap 30 is snapped open via tab 32 to the relation of FIG. 3 at which time the user can by positioning his mouth at the rim 28 pour directly via spout 26 with a minimum possibility of any spillage occurring. Closure of the opening 22 is just as readily effected as by thumb action placing cap 30 onto the rim 28 and forcing it down onto the rim to the snap-on leakproof relation illustrated in FIGS. 2 and 4. Once sealed, any spillage likely to be incurred between the topside of the can and the underside of the lid will not only be readily contained in the cavity therebetween but will not be poured or spilled outward about the lid during subsequent consumption. By virtue of the inwardly depending spout 26 any beverage in the cavity can only emerge through the spout that controls pouring during consumption.

By the above description there has been disclosed a novel lid construction that is reusable and detachable for covering the open top of a beverage can. Having a multiple stepped periphery, the lid construction hereof enjoys the versatility of being usable on cans of at least two different size diameters. By virtue of the spout and rim construction associated with the lid opening, pouring without attendant spillage is more easily and reliably effected than before while a strap held cap enables the lid opening to be easily and quickly opened or closed as required by the occasion. Whereas the lid invention has been described primarily for use with beverage cans, it obviously could be utilized elsewhere such as on drinking cups or whatever.

Since many changes could be made in the above construction and many apparently widely different embodiments of this invention could be made without departing from the scope thereof, it is intended that all matter contained in the drawing and specification shall be interpreted as illustrative and not in a limiting sense.

I claim:

1. A detachable lid for mounting about the top cylindrical end of an opened beverage can containing content to be consumed, said lid comprising:
    (a) an annular disk-like central body section joined about its periphery with at least one downwardly depending annular flange defining an internal diameter adapted to afford a snap-on fit with a can diameter wtih which the lid is to be utilized;
    (b) a pour opening defined through said body adapted to be located in relative register wtih the can opening by positioning the body so as to overly the can opening;
    (c) spout means extending from about the underside of said pour opening downwardly depending contiguous and in beverage pour communication with said pour opening to a can opening thereat; and
    (d) a closure cap secured on said body and adapted to releasably effect a snap fit closure of said pour opening.

2. A detachable lid according to claim 1 in which said spout means comprises a spout of downward dimension sufficient to penetrate inward of a can opening thereat.

3. A detachable lid according to claim 1 in which said at least one flange comprises a pair of stepped flanges including a first flange having an internal diameter able to afford a snap-on fit with a first diameter beverage can and a second flange having an internal diameter able to afford a snap-on fit with a second diameter beverage can of relatively larger diameter than the diameter of the first diameter beverage can.

4. A detachable lid according to claim 1 in which said pour opening is outwardly defined by a rim of predetermined shape upstanding from the surface plane of said body and said closure cap includes an underside recess of configuration complementing the shape of said rim for effecting said releasable closure fit therewith.

5. A detachable lid according to claim 4 in which said closure cap is contained in the free distal end of an elongated and flexible strap secured to said body.

6. A detachable lid according to claim 5 in which said at least one flange comprises a pair of stepped flanges including a first flange having an internal diameter able to afford a snap-on fit with a first diameter beverage can and a second flange having an internal diameter able to afford a snap-on fit with a second diameter beverage can of relatively larger diameter than the diameter of the first diameter beverage can.

7. A detachable lid according to claim 6 in which said flanges, said spout and said strap are each integrally joined to said body.

8. A detachable lid according to claim 7 in which said body and the elements joined to said body are all of a polymer plastic composition.

* * * * *